United States Patent
Antonischki et al.

(10) Patent No.: US 8,632,284 B2
(45) Date of Patent: Jan. 21, 2014

(54) DEVICE AND METHOD FOR MACHINING AN ELECTRICAL CABLE

(71) Applicants: Jorn Antonischki, Fagelmara (SE); Kristian Gustafsson, Karlskrona (SE)

(72) Inventors: Jorn Antonischki, Fagelmara (SE); Kristian Gustafsson, Karlskrona (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/649,833

(22) Filed: Oct. 11, 2012

(65) Prior Publication Data

US 2013/0032011 A1     Feb. 7, 2013

Related U.S. Application Data

(63) Continuation of application No. PCT/EP2010/054964, filed on Apr. 15, 2010.

(51) Int. Cl.
    *B23C 3/02*       (2006.01)

(52) U.S. Cl.
    USPC ............. 409/200; 409/179; 409/132; 82/70.2

(58) Field of Classification Search
    USPC ............. 82/113, 47, 60, 70.2, 72–74, 76, 88, 82/101; 409/178, 179, 199, 200, 131, 132; 81/9.4, 9.51, 9.41–44
    See application file for complete search history.

(56) References Cited

U.S. PATENT DOCUMENTS

| | | | | |
|---|---|---|---|---|
| 3,131,599 | A | * | 5/1964 | Macfarlane et al. .......... 409/180 |
| 3,195,377 | A | * | 7/1965 | Frank ............................. 408/200 |
| 3,712,174 | A | * | 1/1973 | Granfield ....................... 409/138 |
| 5,564,871 | A | * | 10/1996 | Lagsdin ......................... 409/138 |

FOREIGN PATENT DOCUMENTS

| | | | | |
|---|---|---|---|---|
| CN | 2596634 | Y | 12/2003 | |
| JP | 52036391 | A * | 3/1977 | ................ B23C 3/12 |
| JP | 52071789 | A * | 6/1977 | ................ B23C 3/12 |
| JP | 6165331 | A | 6/1994 | |
| JP | 6205520 | A | 7/1994 | |
| JP | 7298442 | A | 11/1995 | |
| JP | 9311259 | A | 12/1997 | |

OTHER PUBLICATIONS

International Preliminary Report on Patentability; Application No. PCT/EP2010/054964; Completed: Jul. 12, 2012; 18 pages.
International Search Report and Written Opinion of the International Searching Authority; Application No. PCT/EP2010/054964; Completed: Sep. 29, 2011; Mailed: Oct. 7, 2011; 11 pages.
Written Opinion of the International Preliminary Examining Authority; Application No. PCT/EP2010/054964; Mailed May 24, 2012; 6 pages.

* cited by examiner

*Primary Examiner* — Daniel Howell
*Assistant Examiner* — Ryan Rufo
(74) *Attorney, Agent, or Firm* — St. Onge Steward Johnston & Reens LLC

(57) ABSTRACT

A device for machining an electrical cable having a cylindrical part and a conical part adjoining the cylindrical part. The device includes a fixture arranged to receive the cable and to hold the cable in a fixed position, the fixture defines an elongated space for accommodating the cable, a tool for removing material from the cable including at least one cutter, and rotational guiding means for guiding a first rotation of the cutter about a longitudinal axis of the space. The cutter is elongated and the longitudinal axis of the cutter is arranged inclined with respect to the longitudinal axis of the space so that the angle between the longitudinal axes of the cutter and the space is between 10 and 80 degrees. The device further includes drive means for providing a second rotation of the cutter about a rotational axis through the tool in order to cause the machining.

13 Claims, 5 Drawing Sheets

DEVICE AND METHOD FOR MACHINING AN ELECTRICAL CABLE

FIELD OF THE INVENTION

The present invention relates to a device and a method for machining an electrical cable having a cylindrical part and a conical part adjoining the cylindrical part. The invention is particularly suitable for machining high and medium voltage cables.

BACKGROUND OF THE INVENTION

A high or medium voltage electrical cable essentially comprises a conductor, a conductor screen surrounding the conductor and an electrical insulation layer surrounding the conductor screen. High voltage electrical cables have robust dimensions with typical outer diameters between 70 to 120 mm. When there is a need to join two cables, one way is to prepare a flexible vulcanized joint between the cable ends. The conductor ends are normally jointed by welding, after which the insulation layer is restored by melting and curing an insulation material in a pressurized mould arranged around the cable. For enabling the welding of the conductors, the cable ends have to be stripped.

In order to improve the subsequent restoration of the insulation layer, it is a common practice to give the stripped cable ends a specific form comprising a conical insulation layer end. The tapering of the insulation layer is conventionally done with a tool known as a "pencil sharpener". CN2596634 discloses an example of a tool of this type. The tool comprises two cutting edges arranged in the same plane as the axis of the cable, but inclined with respect to the axis of the cable. The cutting edges are turned about the cable axis. This tool achieves a sharp transition between the conductor screen and the insulation cone. The transition forms a cone edge that is conventionally shaped using a knife. In consequence, the cone edge often appears as a circular row of facets. The surfaces are finally given a finishing touch by grinding.

The geometry of the cone edge has a great significance to the cable performance as experience shows that most electrical breakdowns in flexible vulcanized joints at higher voltages occur at the cone edge. In presence of irregularities like facets following from shaping the cone edge with a knife, the breakdowns are initiated at the edges of the facets. Moreover, irregularities on the cone surface may lead to locally enhanced electric field strength and can also initiate an electrical breakdown. The described conventional method for stripping an electrical cable is unsatisfactory in that the quality of the resulting cable joint is strongly dependant on the skills of the person shaping the cone edge.

JP9311259 discloses a method and tool for cutting a cable terminal so that its surface slants at a specific angle relative to the axis of the cable terminal. The tool includes a housing provided with means for locking the cable to one end of the housing, and a rotating cutting blade which is brought into contact with an end of the cable during the cutting. The longitudinal axis of the cutting blade is arranged in the same plane as the axis of the cable, but inclined with respect to the axis of the cable. The cutting blade rotates about its axis and revolves around the peripheral surface of the cable to cut the surface of the cable in a tapered shape. The rotation of the blade around the peripheral surface of the cable is driven by means of a driving shaft and a handle.

JP06205520 discloses a device for stripping cables enabling formation of a tapered surface of a cable. The cable is held between a pair of holding bodies. The device comprises a cutter arranged for removing material from the cable, a movable guide frame moving the cutter in the direction of the radius of the cable at the same time as the cutter is moved along the cable axis, and rotational guiding means for guiding a rotation of the cutter about the longitudinal axis of the cable at the same time as the cutter is moved along the longitudinal axis of the cable. This stripping device achieves a helical cutting of the cone, and accordingly the surface of the cone obtains a screw pattern. Further, this device achieves a sharp transition between the cylindrical conductor screen and the cone shaped part of the insulation layer. In order to avoid electrical breakdown in the cable joints, the cable has to go through a machining step in which the cylindrical surface of the conductor screen, the cone edge, and the surface of the cone is grinded in order to achieve a soft transition between the cylindrical part and the conical part of the cable and a smooth surface of the cone as well as the conductor screen.

Thus, it is difficult to achieve a satisfactory cable joint quality with the currently available tools.

SUMMARY OF THE INVENTION

One object of the present invention is to provide a device for machining a cable in order to achieve a soft transition between the cylindrical part and the conical part of the cable and a smooth surface of the cone to improve quality of cable joints.

This object is achieved by a device for machining an electrical cable.

Such a device comprises a fixture arranged to receive the cable and to hold the cable in a fixed position, the fixture defines an elongated space for accommodating the cable, a tool for removing material from the cable including at least one elongated cutter, and rotational guiding means for guiding a first rotation of the cutter about a longitudinal axis of said space. The cutter is elongated and the longitudinal axis of the cutter is arranged inclined with respect to the longitudinal axis of the space so that the angle between the longitudinal axes of the cutter and the space is between 10 and 80 degrees. The device further comprises drive means for providing a second rotation of the cutter about a rotational axis through the tool in order to cause the machining, and the cutter is adapted to be in contact with the surface of the conical part of the cable as well as the transition between the cylindrical part and the conical part during the machining.

The device according to the invention uses a cutter that is rotated at a rather high cutting speed during the machining of the cable. The device makes it possible to machine the surface of the cone and the cone edge in one movement, i. e. by rotating the cutter one turn around the cable. The device achieves a smooth surface of the cone and a soft transition between the cone and the cylindrical part, which is necessary for providing as perfect electrical conditions as possible.

According to an embodiment of the invention, the device further comprises a radial adjusting means for adjusting the distance of the cutter from the axial centre of said space. The device may further comprise an axial adjusting means for adjusting the position of the cutter along the longitudinal axis of the space. Before the machining begins, the cutter must be positioned so that it is in contact with the surface of the conical part of the cable as well as the transition between the cylindrical part and the conical part in order to achieve the desired result of the machining. The radial and axial adjusting means facilitates the adjustment of the position of the cutter relative the cable.

According to an embodiment of the invention, the angle between the longitudinal axis of the cutter and longitudinal axis of the space is between 30 and 60 degrees. The longitudinal axis of the cable coincides with the longitudinal axis of the space when the cable is positioned in the fixture. The angle between the longitudinal axis of the cutter and the longitudinal axis of the cable depends on the slope of the cone to be machined. With an angle between 30 and 60 degrees the typical cone shapes for cables are covered. Preferably, the angle between the longitudinal axis of the cutter and longitudinal axis of the space is adjustable.

According to an embodiment of the invention, said drive means for providing the second rotation of the cutter is configured to provide a cutting speed of the cutter that is larger than 0.03 m/s. In order to achieve a smooth machining the speed of the cutter must be rather high.

The rotational movement of the cutter about the cable can be made manually or automatically. According to an embodiment of the invention, the device comprises an actuator for providing the first rotation of the cutter. An actuator can perform even more movement than an operator can perform by a manual movement.

According to an embodiment of the invention, the tool for removing material comprises a cylindrical body having a central axis, the cutter is provided on the body with its longitudinal axis parallel with the central axis of the body, and the cutter is arranged rotational about the central axis of the body. In this embodiment, the drive means is arranged to provide the second rotation of the cutter about a rotational axis parallel to a longitudinal axis of the cutter. Such a tool is easy to manufacture.

According to an embodiment of the invention, the body has a radius larger than 5 mm. The diameter of the body determines the shape of the transition between the cone and the cylindrical part. The transition will have almost the same radius as the radius of the cylindrical body. With a cylindrical body having a radius larger than 5 mm a soft transition is achieved.

According to an embodiment of the invention, the cutter has a length larger than 40 mm. In order to make it possible to machine the surface of the cone and the cone edge in one movement the length of the cutter should cover the surface of the cone as well as the cone edge. With a cutter having a length larger than 40 mm this is achieved for the typical cone sizes of electrical cables.

Another object of the present invention is to provide a method for machining a cable by means of a device according to the invention, in order to achieve a soft transition between the cylindrical part and the conical part of the cable and a smooth surface of the cone to improve quality of cable joints.

This object is achieved by a method for machining an electrical cable.

The method comprises positioning the cable into the fixture, adjusting the position of the cutter so that the cutter is in contact with the surface of the conical part of the cable as well as the transition between the cylindrical part and the conical part, and rotating the cutter about a rotational axis through the tool and at the same time rotating the tool about the longitudinal axial of the cable.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
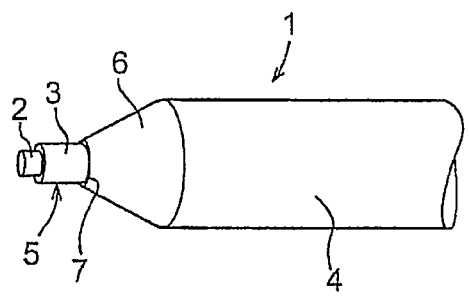
FIG. 1 shows an example of a stripped cable.

FIG. 1 shows an example of a stripped cable 1. The cable comprises a conductor 2, a conductor screen 3 surrounding the conductor, and an electrical insulation layer 4 surrounding the conductor screen 3. The conductor 2 and the conductor screen 3 form a cylindrical part 5. The insulation layer includes a conical part 6 adjoining the cylindrical part 5. The transition between cylindrical part 5 and conical part 6 includes a cone edge 7. The cone edge 7 is a part of the transition between the cone 6 and the cylindrical part 5.

Figure 2:
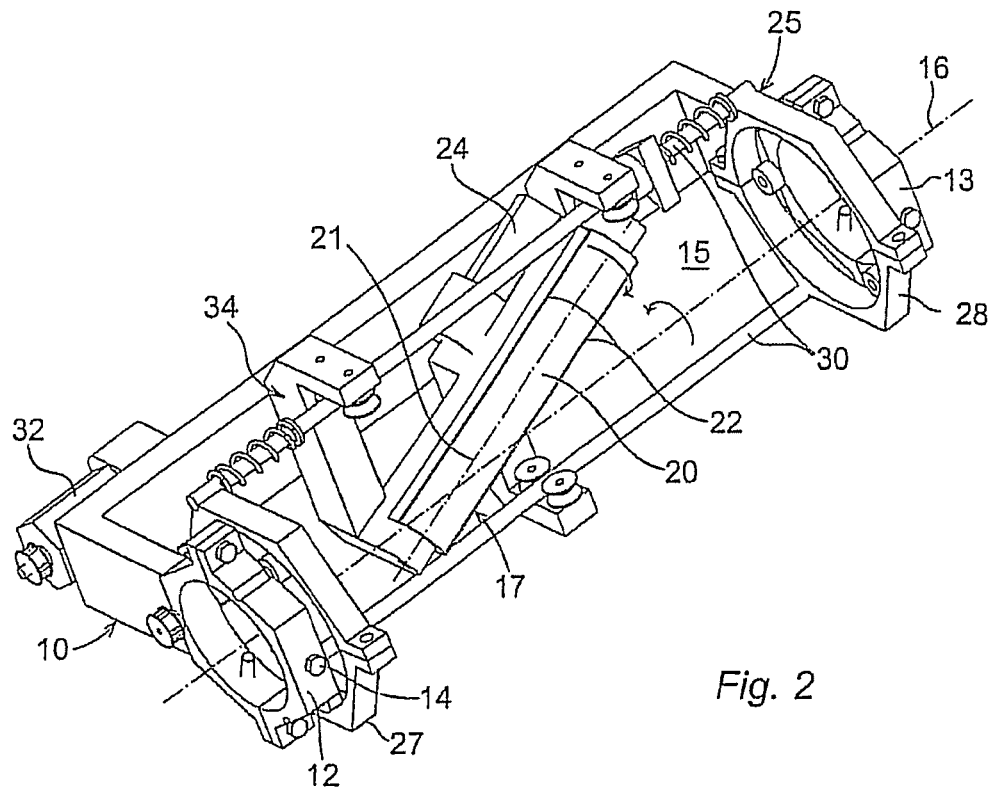
FIG. 2 shows a perspective view of a device for machining an electrical cable according to an embodiment of the invention.
Figure 3:
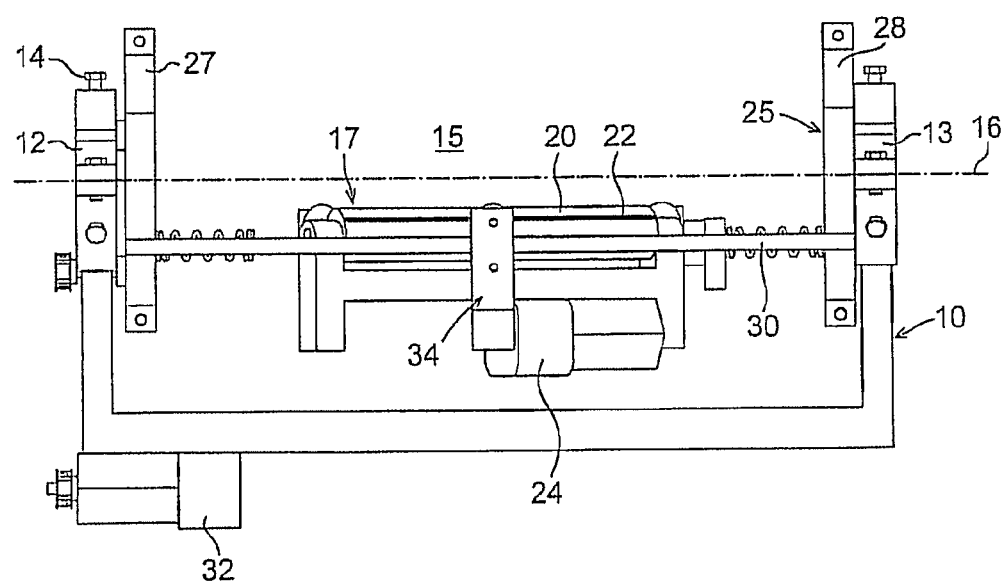
FIG. 3 shows a side view of the device shown in FIG. 2.
Figure 4:
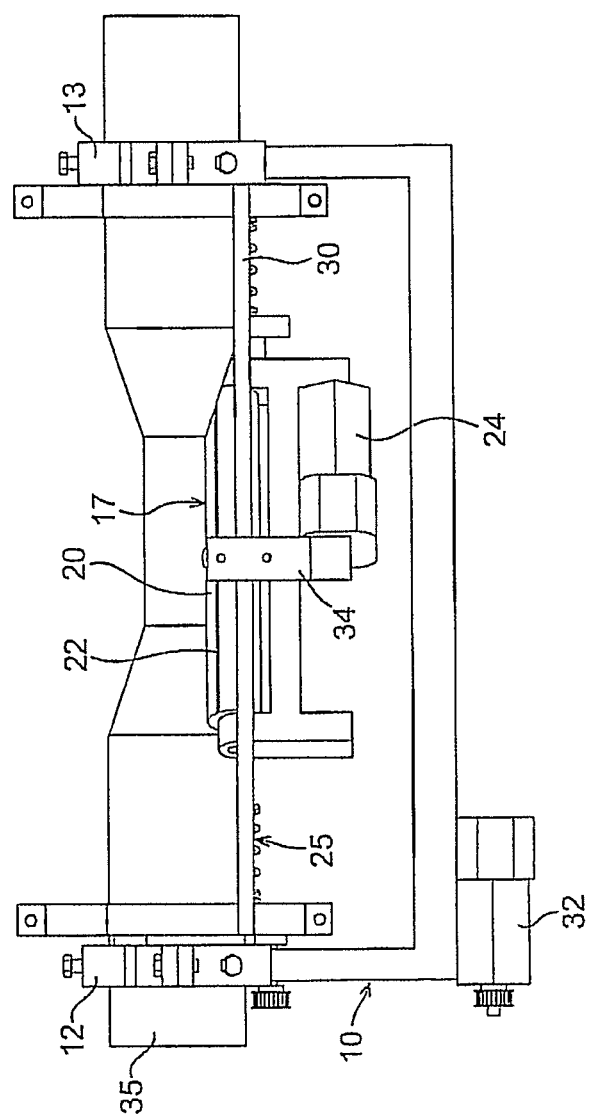
FIG. 4 shows a side view of the device holding a cable to be machined.
Figure 5:
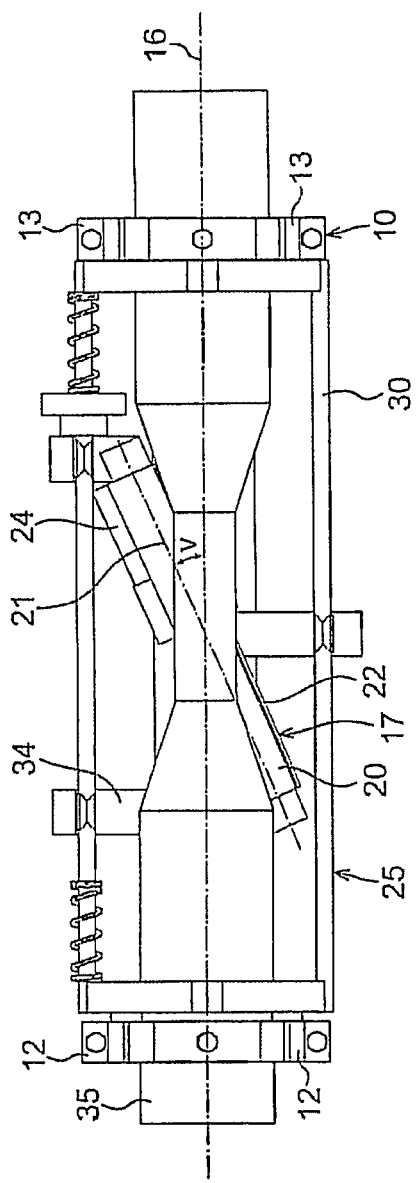
FIG. 5 shows the device holding the cable in a view seen from above.

FIGS. 2-5 show a device for machining a cable 35 according to an embodiment of the invention. FIGS. 2-3 show the device without a cable and FIGS. 4-5 show the device holding a cable. The device comprises a fixture 10 arranged to receive the cable and to hold the cable in a fixed position. The fixture includes a first and a second holding element 12, 13 arranged at a distance from each other and adapted to receive the cable and to hold the cable in a fixed position. Each of the holding elements 12, 13 is provided with an opening for receiving the cable and fixating means, for example, in the form of tightening screws 14, for fixating the cable in a define position. Preferably, the holding elements are divisible so that the cable can be entered into the fixture from above. Accordingly it is not necessary to enter an end of the cable through the openings. The fixture defines an elongated space 15 for accommodating the cable. The space 15 has a longitudinal axis 16, which coincides with the longitudinal axis of the cable when the cable is fixated in the fixture.

The device further comprises a tool 17 arranged for removing material from the cable. The tool includes a cylindrical body 20 in the form of a drum having a central axis 21. The drum is provided with at least one elongated cutter 22 arranged with its longitudinal axis parallel to the central axis 21 of the drum. The drum may comprise more than one cutter. In this embodiment two cutters are arranged parallel to the central axis 21 of the drum and on opposite sides of the drum. The drum is arranged rotational about its central axis 21, and accordingly the cutter or cutters are arranged rotational about the central axis 21 of the drum. The central axis 21 of the drum, and accordingly the longitudinal axis of the cutter, is arranged inclined with respect to the longitudinal axis 16 of the space so that the angle v between the central axis 21 of the drum and the longitudinal axis 16 of the space is between 10 and 80 degrees, preferably between 30 and 60 degrees and more preferably between 40-50 degrees. The device is provided with drive means 24 including a motor for providing the rotation of the drum 20 about its central axis 21 and accordingly the rotation of the cutter 22. The drive means 24 for providing the rotation of the cutter is configured to provide a cutting speed of the cutter larger than 0.03 m/s.

The device further includes a frame 25 including a first and a second ring shaped element 27, 28 arranged close to the holding elements 12, 13 of the fixture and including openings for receiving the cable, and two rods 30 arranged between the ring shaped elements 27, 28 and parallel to the longitudinal axis 16 of the space of the fixture. The tool 17 including the cutter 22 is connected to the frame 25. The frame 25 is arranged rotatable relative the fixture 10 and accordingly rotatable relative the cable when the cable is held by the fixture. The frame 25 is arranged rotatable relative the fixture 10 in such a way that the drum 20 and accordingly the cutters 22 are rotated about the longitudinal axis 16 of the space. The cutting speed of the cutter is typically 20 meter per minute. In this embodiment, the device comprises an actuator 32 for providing the rotation of the frame relative the fixture. In this embodiment the rotational speed of the tool about the longitudinal axis of the cable is about one turn per second. In an alternative embodiment, the rotation can be made manually.

The device comprises axial adjusting means for adjusting the position of the cutter along the longitudinal axis 16 of the space and accordingly along the longitudinal axis of the cable. In this embodiment, the axial adjusting means includes a carriage 34 arranged linearly movable along the rods 30, which are arranged parallel to the longitudinal axis of the space. Accordingly, the carriage is movable in a direction parallel to the direction of the longitudinal axis of the space. The axial adjusting means also includes means for locking the carriage in a desired position along the rod. The tool 17 including the drum 20 and the cutters 22 are arranged on the carriage 34.

The cutter is adapted to be in contact with the surface of the conical part as well as the transition during the machining, as shown in FIG. 5. The radiuses of the drum as well as the length of the cutter are important features for the result of the machining. The device will provide a soft transition between the cylindrical part and the conical part, the transition having about the same radius as the drum. The radius of the cutter is preferably in the order of 15 mm. The cutter 22 and the drum 20 are elongated and should preferably have a length which is longer than the lengths of the conical part of the cable including the transition between the conical part and the cylindrical part. This makes it possible to perform the machining by simply turning the tool one turn around the cable.

Figure 6:
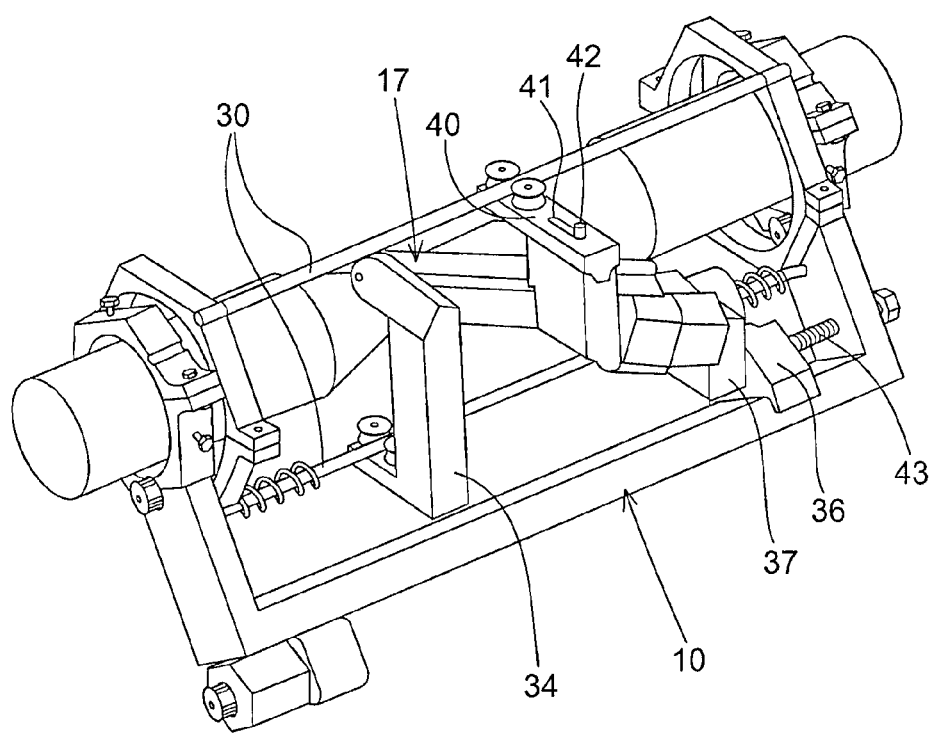
FIG. 6 shows a perspective view of a device according to a second embodiment of the invention.

FIG. 6 shows a device according to an embodiment of the invention. In this embodiment the device is provided with a mechanism for moving the tool and accordingly the cutters in an axial direction of the cable. As seen in the figure, the cable includes two conical parts and an intermediate cylindrical part. In order to provide machining of both conical parts and the cylindrical part, the tool 17 is moved along the longitudinal axis of the cable. The moving mechanism means can be designed in many different ways. In this embodiment, the moving mechanism includes a screw 43 extending through the frame 10 and connected to a threaded piece 36. The feeding mechanism further includes a threaded gear wheel 37. The gear wheel 37 is operatively connected to the carriage 34 and is designed to fit to the threads of the piece 36. The carriage 34 is arranged movable along the rods 30. When the carriage 34 including the tool 17 has been moved one turn around the cable, the carriage is moved a distance along the axis of the cable in order to be able to machine another part of the cable. In one embodiment of the invention, the moving mechanism is arranged to automatically move the tool a predetermined distance along the axis of the cable at each turn the frame 25 is rotated relative to the fixture 10.

The device further comprises radial adjusting means for adjusting the distance of tool including the cutters 22 from the longitudinal axis 16 of the space and accordingly for adjusting the distance between the cutter and the cable. This distance determines the machining depths. The radial adjusting means can be designed in many different ways. In this embodiment the radial adjusting means includes an adjusting element 40 provided with an elongated hole 41 and at one end connected to one of the rods 30 and at the other end movably connected to the carriage 34. The adjusting means further includes a screw 42 for locking the tool in a desired radial position. The adjusting element 40 is arranged movably with respect to the carriage 34 in a radial direction of the cable thereby achieving an adjustment of the distance between the cutter and the cable.

Now, the use of the cable stripping device according to the figures is described in detail. The insulating layers of two cable pieces are first roughly tapered e.g. by using the conventional "pencil sharpener" or the stripping device disclosed in JP06205520. Some centimeters of the conductor tip is exposed by removing the conductor screen, but on the rest of the conductor tip the conductor screen is left untouched under a thin insulating layer. The two cable pieces are connected to each other to form a cable 35, and the joint between the cable pieces is covered with an insulating material. The cable 35 is positioned in the fixture as shown in FIGS. 4 and 5, and locked in the fixture by applying the tightening screws 14. The position of the cutter is adjusted in the axial direction of the cable by moving the carriage 34 along the rods 30 and locking the carriage when the cutter is in a desired position relative the cable. The position of the cutter is adjusted in the radial direction of the cable by adjusting the position of the element 40.

The position of the tool is adjusted so that the cutter is in contact with the surface of one of the conical parts of the cable as well as the transition between the cylindrical part and the conical part, as shown in FIGS. 4 and 5. Preferably, the cutter is in contact with the surface of the conical part along the entire length of the conical part in order to provide machining of the entire cone in one step as well as in contact with the cylindrical part ending at a small distance from the cone edge in order to provide a smooth transition between the cylindrical and the conical part.

When the position of the tool has been adjusted in a desired manner, the drum 20 is rotated about its rotational axis 21 with a fixed rotational speed at the same time as the frame 25 is rotated relative to the fixture 10 about the longitudinal axis of the cable. Accordingly, the rotating cutter is moved along the surface of the cone and along the transition between the cylindrical and conical part in a direction around the cable axis. If the cutter has been adjusted to be in contact with the surface of the conical part along the entire length of the conical part it is enough to rotate the frame one turn about the cable axis. However, in order to further improve the result of the machining the frame can be rotated more than one turn. If necessary, the distance between the cutter and the cable can be adjusted between each turn in order to adjust the machining depth.

When the machining of the cone is finished the tool is moved to a new position along the axis of the cable so that the cylindrical part of the cable can be machined. When the position of the tool has been adjusted in a desired manner, the tool is rotated about the rotational axis 21 at the same time as the frame 25 is rotated relative to the fixture 10 about the longitudinal axis of the cable. When the machining of the cylindrical part has been finished, the tool is moved to the other conical part and the same machining procedure as described above is repeated for the second cone.

According to an embodiment of the invention (not shown) the operation of the device is automated. The automation involves providing the device with distance sensors and servo control in order to replace manual operation.

The present invention is not limited to the embodiments disclosed but may be varied and modified within the scope of the following claims. For example, the fixture and the frame can be constructed in many different ways. Further, according to an embodiment of the invention, the drum is shaped as a cone and the tool is arranged rotational about the central axis of the cone. In that case the longitudinal axes of the cutters are not parallel with the rotational axis of the drum. In this embodiment it is possible that the rotational axis of the drum is arranged parallel with the longitudinal axis of the space. However, in that case the rotational axis of the drum is arranged at a distance from the longitudinal axis of the space.

What is claimed is:

1. A device for machining an electrical cable including a joint having a cylindrical part and at least one conical part adjoining the cylindrical part, the device comprising:
    a fixture arranged to receive the cable and to hold the cable in a fixed position, the fixture defines an elongated space for accommodating the cable such that the longitudinal axis of the cable extends along the longitudinal axis of the elongated space,
    a tool for removing material from the cable including at least one elongated cutter having a longitudinal axis arranged inclined with respect to the longitudinal axis of said space so that the angle between the longitudinal axes of the cutter and the space is between 10 and 80 degrees,
    rotational guiding means for guiding a first rotation of the cutter about a longitudinal axis of said space, and
    drive means for providing a second rotation of the cutter about a rotational axis through the tool in order to cause the machining, characterized in that
    the fixture comprises a first and a second holding element for holding the cable in a fixed position, and arranged on opposite sides of said tool,
    the longitudinal axis of the cutter and the longitudinal axis of said space lie on skew lines, and
    the rotational guiding means comprises a frame mechanically connected to the tool, and the frame is arranged rotatable relative the fixture in such a way that the tool rotates about the longitudinal axis of the space, and
    the cutter is adapted to be in contact with the surface of the conical part of the cable as well as the transition between the cylindrical part and the conical part during the machining.

2. The device according to claim 1, wherein the device further comprises a radial adjusting means for adjusting the distance of the cutter from the axial centre of said space.

3. The device according to claim 1, wherein the device further comprises an axial adjusting means for adjusting the position of the cutter along the longitudinal axis of the space.

4. The device according to claim 1, wherein the angle between the longitudinal axis of the cutter and longitudinal axis of the space is between 30 and 60 degrees.

5. The device according to claim 1, wherein said drive means for providing the second rotation of the cutter is configured to provided a cutting speed of the cutter that is larger than 0.03 meters per second.

6. The device according to claim 1, wherein the device comprises an actuator for providing said first rotation of the cutter.

7. The device according to claim 1,
    wherein said tool comprises a cylindrical body having a central axis and said at least one elongated cutter is arranged with its longitudinal axis parallel to the central axis; and,
    wherein said drive means is arranged to provide the second rotation of the cutter about a rotational axis parallel to said central axis.

8. The device according to claim 1, wherein the tool for removing material comprises a cylindrical body having a central axis, the cutter is provided on the body with its longitudinal axis parallel with the central axis of the body, and the cutter is arranged rotational about the central axis of the body.

9. The device according to claim 8, wherein the body has a radius larger than 5mm.

10. The device according to claim 1 wherein the cutter has a length larger than 40 mm.

11. A method for machining an electrical cable including a joint having a cylindrical part and at least one conical part adjoining the cylindrical part, by means of a device comprising a fixture arranged to receive the cable and to hold the cable in a fixed position, the fixture defines an elongated space for accommodating the cable such that the longitudinal axis of the cable extends along the longitudinal axis of the elongated space, and a tool for removing material from the cable including at least one elongated cutter, characterized in that the method comprises:
    arranging the cutter so that the longitudinal axis of the cutter and the longitudinal axis of said space lie on skew lines, and the longitudinal axis of the cutter is arranged inclined with respect to the longitudinal axis of said space so that the angle between the longitudinal axes of the cutter and the space is between 10 and 80 degrees,
    positioning the cable into the fixture,
    locking the cable in two positions; a first position on one side of the joint and a second position on the other side of the joint,
    adjusting the position of the cutter so that the cutter is in contact with the surface of the conical part of the cable as well as the transition between the cylindrical part and the conical part, and
    rotating the cutter about a rotational axis through the tool and at the same time rotating the tool about the longitudinal axial of the cable.

12. The method according to claim 11, wherein the cutter is rotated about said rotational axis through the tool with a rotational speed that is essentially larger than the rotational speed of the cutter about the longitudinal axial of the cable.

13. The method according to claim 11, wherein the rotational speed of the cutter about said rotational axis through the tool is larger than 0.03 meters per second.

* * * * *